April 26, 1966  H. C. CONGELLI ETAL  3,248,108
PIVOTING DISTRIBUTOR CONVEYOR ADAPTED TO DELIVERY
PINS SELECTIVELY FROM THE SIDES
AND FREE END THEREOF
Filed May 18, 1962  6 Sheets-Sheet 3
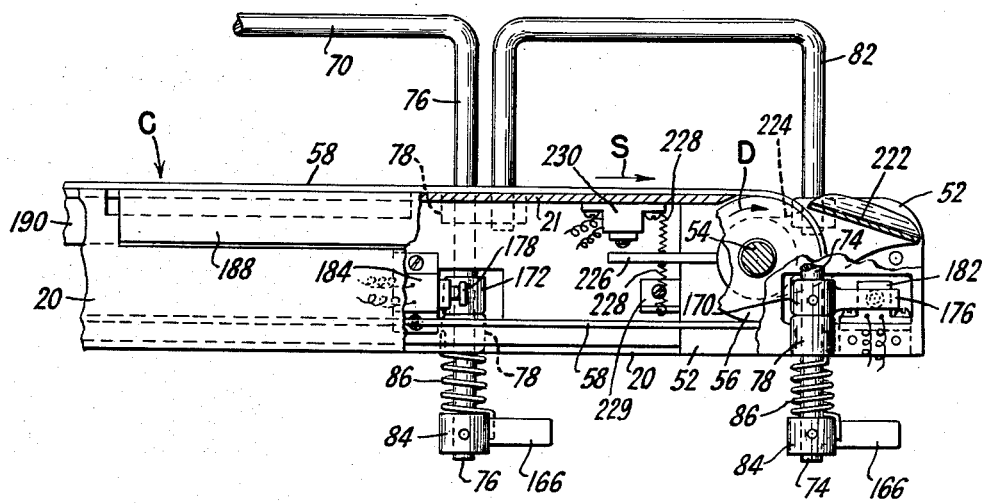
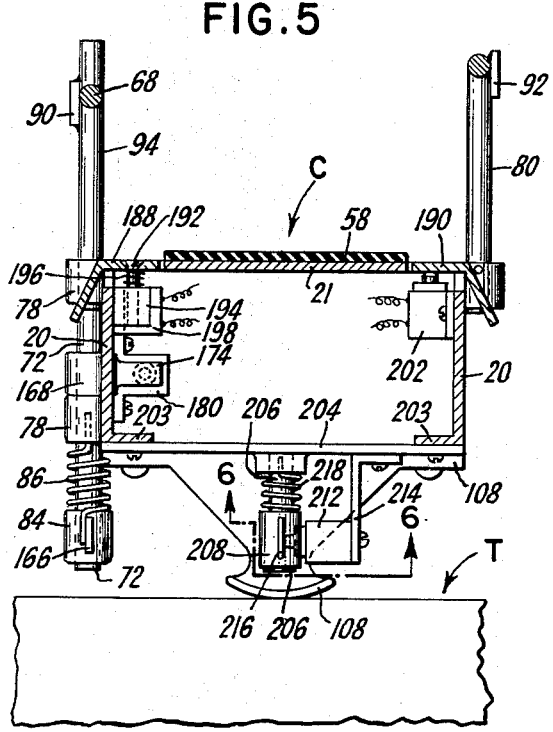
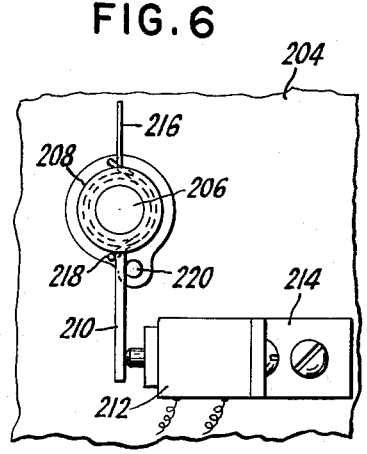
INVENTORS
HENRY C. CONGELLI
GORDON W. HAYS
CHARLES E. SCHON
BY
ATTORNEY

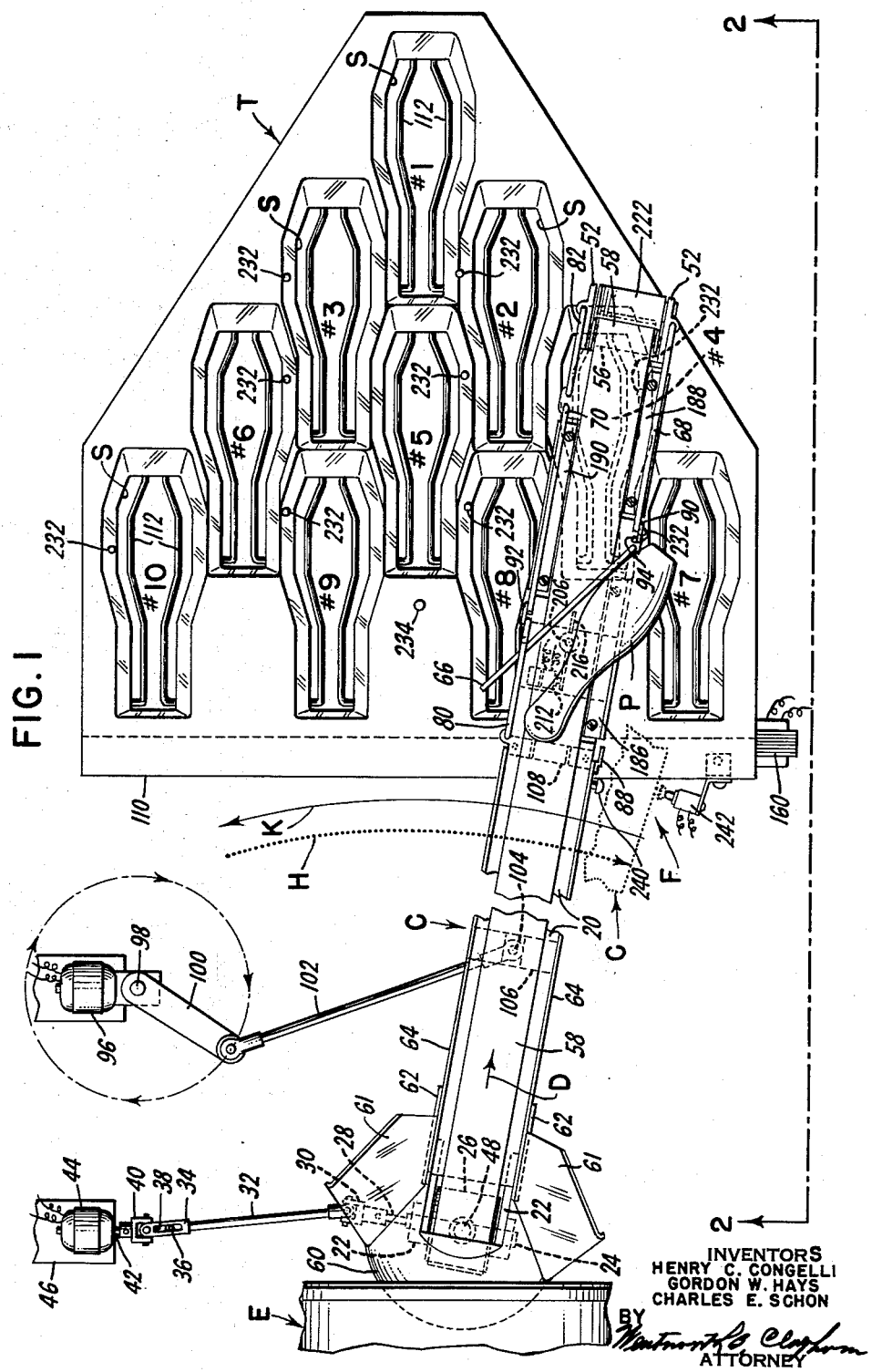

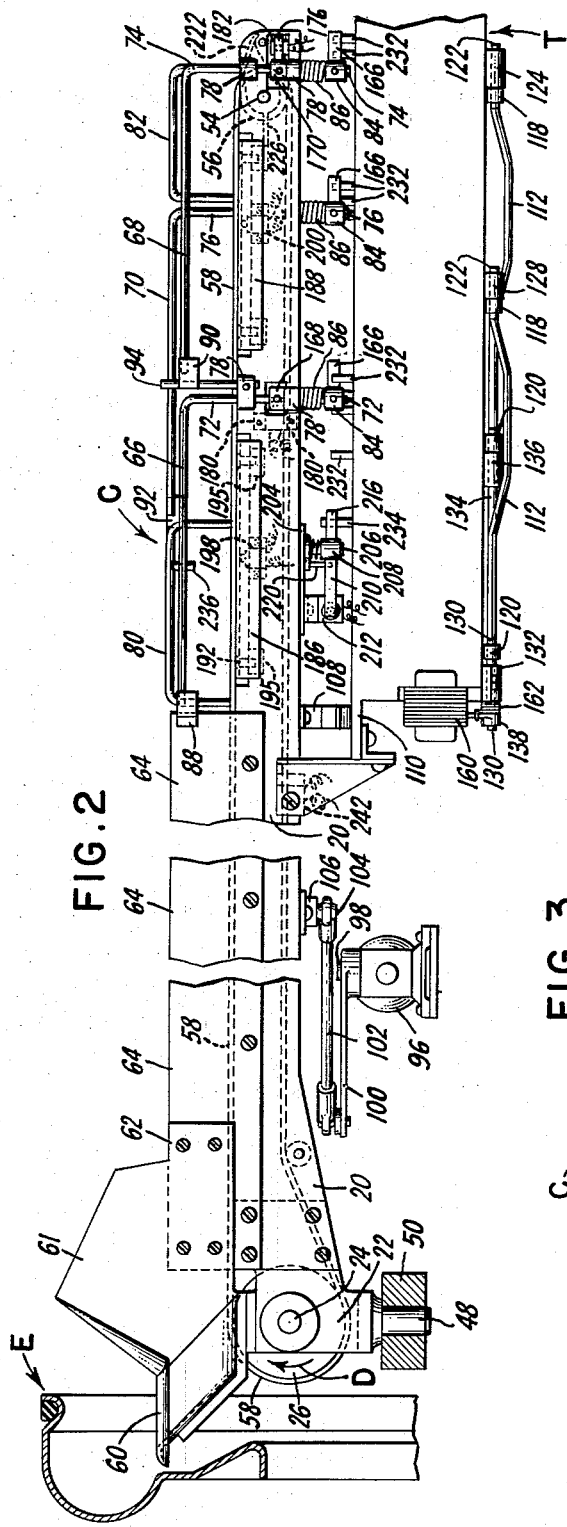
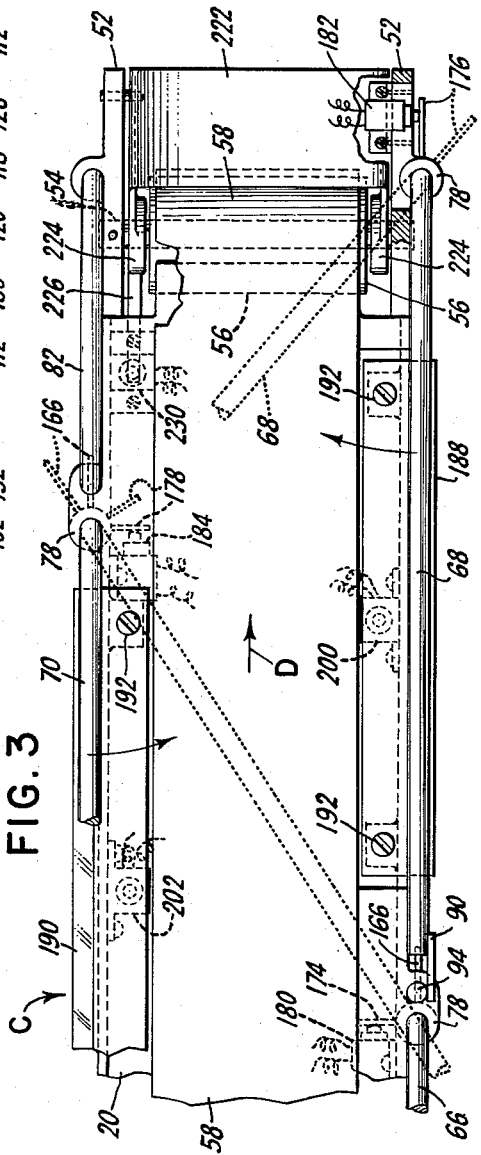

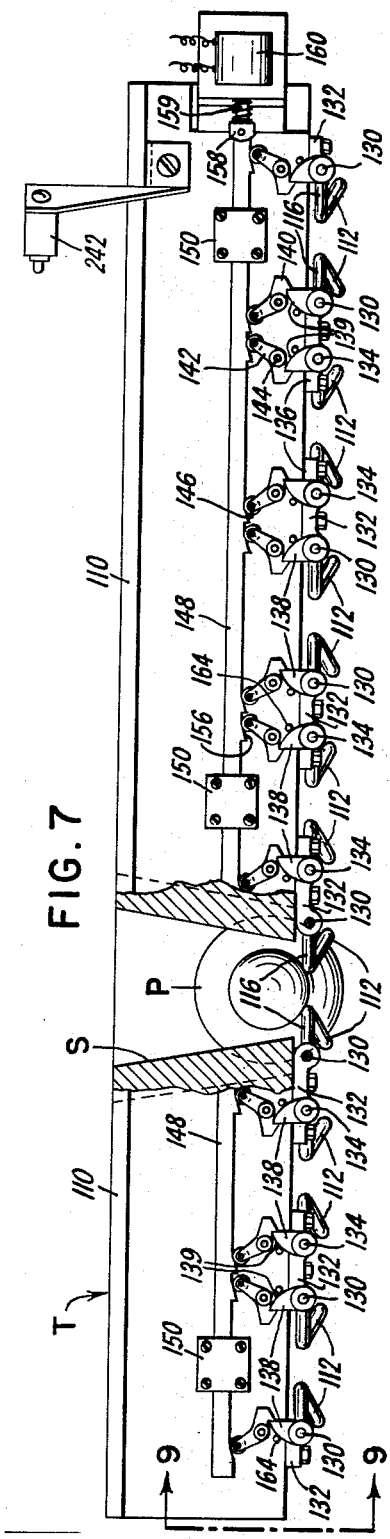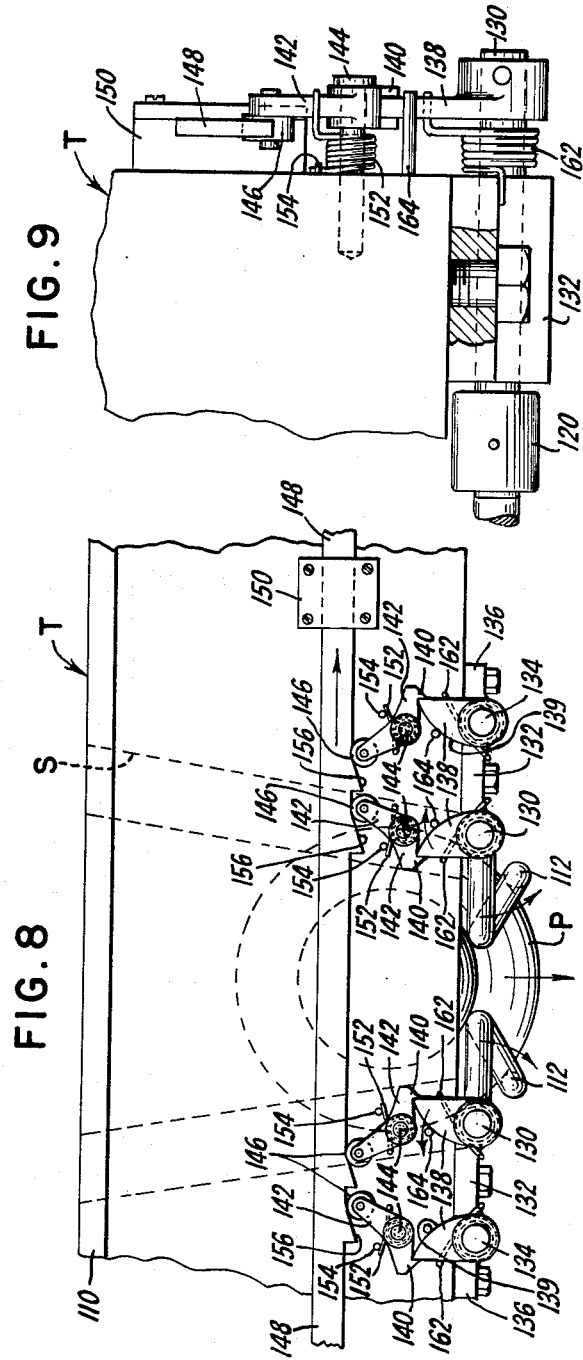

April 26, 1966   H. C. CONGELLI ETAL   3,248,108
PIVOTING DISTRIBUTOR CONVEYOR ADAPTED TO DELIVERY
PINS SELECTIVELY FROM THE SIDES
AND FREE END THEREOF
Filed May 18, 1962   6 Sheets-Sheet 5
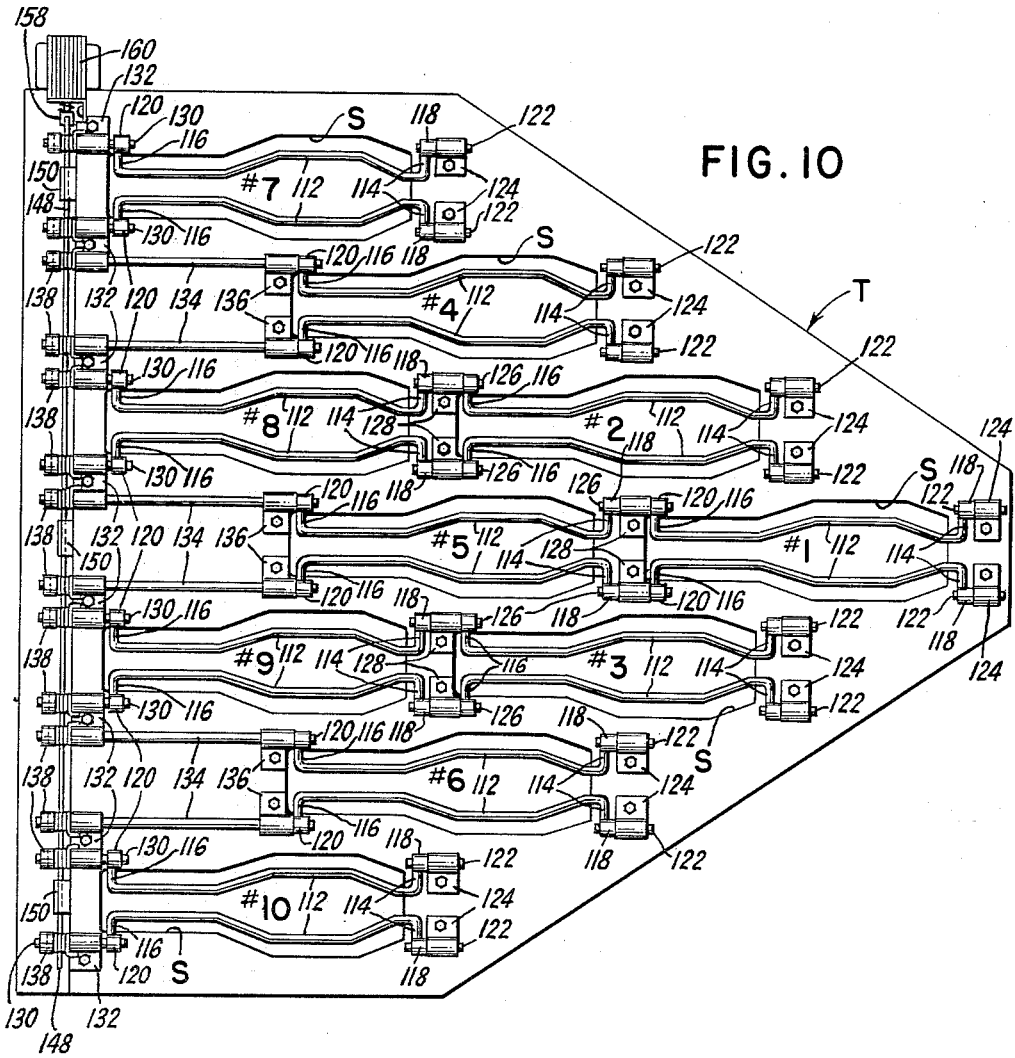
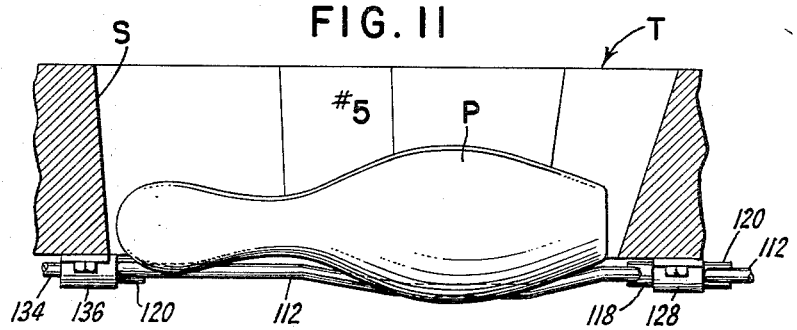
INVENTORS
HENRY C. CONGELLI
GORDON W. HAYS
CHARLES E. SCHON
BY
ATTORNEY

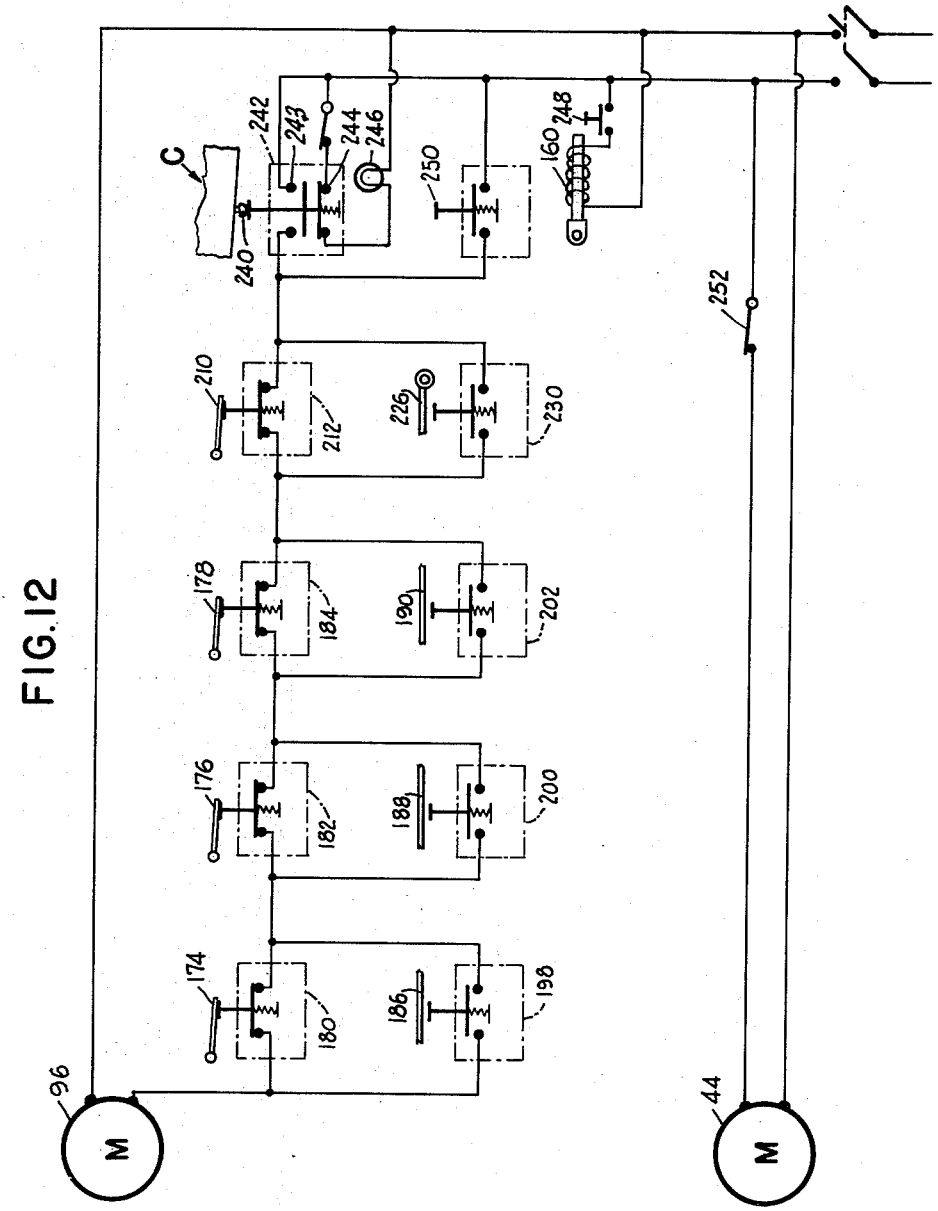

# United States Patent Office 3,248,108
Patented Apr. 26, 1966

3,248,108
PIVOTING DISTRIBUTOR CONVEYOR ADAPTED TO DELIVER PINS SELECTIVELY FROM THE SIDES AND FREE END THEREOF
Henry C. Congelli, Stamford, and Gordon W. Hays, Springdale, Conn., and Charles E. Schon, West Hempstead, N.Y., assignors to American Machine & Foundry Company, a corporation of New Jersey
Filed May 18, 1962, Ser. No. 195,921
23 Claims. (Cl. 273—43)

This invention relates to bowling pin spotting machines, and more particularly to improvements in apparatus for distributing and storing pins to be set on the pin deck of the bowling alley.

In the game of bowling, it is always important that bowling pins be removed from the pit of the bowling alley after each frame has been completed and returned to mechanism, which will spot them on the pin deck of a bowling alley for continued play of the game. That is, after each first or second ball, it is desirable that pins be removed from the pit of an alley in a minimum of time and delivered to an elevated position where they are distributed into storage means for subsequent delivery to a pin spotter which will place them in usual playing arrangement on the bowling alley.

The present invention relates to improvements in mechanism which receives pins elevated from the pit of a bowling alley and delivers them one by one into storage compartments for subsequent delivery into pin spotters or cups which place them on the alley. According to the present invention, the pin distributing mechanism comprises a traveling elongated arm or boom which is so constructed that individual pins received thereby, are conveyed by endless conveyor means supported on the boom forwardly to points of discharge therefrom into selected storage compartments or bins of the storage apparatus. One of the important features of the invention, is a provision of a pivotal mounting for one end of the boom, such that it can be moved transversely in a plane above the pin storage compartments of the storage apparatus and each pin can be selectively delivered from the boom into a selected compartment. This construction constitutes an important advance in the art because it effects a rapid delivery of pins to selected storage compartments in a minimum of time and avoids the need for relatively complex stopping and starting mechanism.

It is an object of the invention to provide an improved pin handling distributing and storage system, wherein there is provided an elongated traveling member which systematically delivers bowling pins into selected pin storage compartments for subsequent discharge into pin spotting mechanism.

The invention is further characterized by the provision of an elongated swingably mounted member, having endless conveying means mounted thereon, and means associated therewith for delivering bowling pins to the endless conveyor means for subsequent discharge thereupon into selected pin storage compartments or bins.

It is also an object of the invention to provide an improved bowling pin distributing and handling mechanism wherein there is provided an elongated swingably mounted member or boom having a plurality of discharge stations from which stations, bowling pins are discharged in response to the movement of the boom, transversely across and above the pin storage device into selected triangularly arranged pin storage compartments for subsequent delivery into a pin spotting mechanism.

The invention further comprises a swingably mounted elongated bowling pin handling and conveying device operative to receive bowling pins elevated from the pit of a bowling alley and convey such pins seriatim butt end forwardly to selected points of discharge from the boom, such that, as the boom is traveled laterally, back and forth, above a pit storage apparatus, selected pins are delivered into selected compartments thereof.

Other objects and advantages of the invention will be pointed out specifically, or will become apparent from the following description when it is considered in conjunction with the appended claims and the accompanying drawings in which:

FIGURE 1 is a plan view illustrating a preferred form of our invention.

FIGURE 2 is a side elevation taken on line 2—2 of FIGURE 1.

FIGURE 3 is a plan view of the delivery end portion of the pin distributing apparatus shown in FIGURES 1 and 2.

FIGURE 4 is a partial side elevation, partly in section, of the mechanism shown in FIGURE 3.

FIGURE 5 is a sectional end elevation of the mechanism shown in FIGURE 2.

FIGURE 6 is a partial bottom view taken on line 6—6 of FIGURE 5.

FIGURE 7 is an end elevation, partly in section of a pin alining and storage mechanism, embodying our invention.

FIGURE 8 is a partial end elevation illustrating details of the pin storage device or table.

FIGURE 9 is a partial side elevation taken on line 9—9 in FIGURE 7.

FIGURE 10 is a bottom view of the pin storage and alining table illustrating the arrangement and construction of its pin supporting and delivering members.

FIGURE 11 is a sectional side elevational through one of the pin receiving pockets of the storage table, and FIGURE 12 is a wiring diagram illustrating a suitable circuit for effecting the electrical control of apparatus constructed in accordance with our invention.

Referring to the drawings, and more particularly the FIGURE 1, it will be seen that there is disclosed, bowling pin handling apparatus which comprises a bowling pin elevating mechanism designated generally E, a pin distributing mechanism or distributor generally designated C, and a pin storage apparatus or table generally designated T.

Bowling pins are delivered by elevator E to distributor C which is moved in accordance with a predetermined timed relationship movement back and forth across storage table T during which time pins are delivered from distributor C into selected pockets 1–10 inclusive.

The bowling pin elevating mechanism E may be of the same general type as that disclosed in Holloway et al. Patent 2,767,983. Since, however, this mechanism forms no specific part of the present invention, further description and illustration thereof is deemed unnecessary, and is omitted in the interests of brevity.

Referring now particularly to FIGURES 1, 2, 3, 4, and 5, it will be seen that the distributor C comprises an elongated, non-telescoping conveyor or boom, which consists of an inverted U-shaped channel 20. Secured to one end of channel 20 is a bearing lug 22 (FIGURES 1 and 2) which rotatably supports horizontal shaft 24 on which pulley 26 is mounted. One end of shaft 24 is provided with an extension 28, coupled by a conventional universal 30 (FIGURE 1) to one end of shaft 32. The other end of shaft 32, is provided with a pin 36 which engages with suitable slots 38 in sleeve shaft 34. This latter shaft is coupled by a conventional type of universal coupling 40 to the free end of shaft 42 of motor 44 mounted on bracket 46 on the machine frame (not shown).

Lug 22 also is provided with a downwardly projecting pivot or stud 48, rotatably supported in a suitable bearing block 50 mounted on the frame of the machine (not shown). The free or delivery end of U-shaped channel 20 is provided with a pair of spaced bearing lugs 52, preferably formed integrally therewith (FIGURES 1, 3 and 4). Mounted in these lugs is a horizontal shaft 54 on which is freely rotatably mounted a pulley 56. Running on pulley 26 at the receiving end of channel 20 and on pulley 56 at the delivery end thereof is a suitable conveyor belt 58. This belt preferably is driven continuously in the direction of arrow D by means of motor 44 and driving pulley 26, the latter being driven in the manner described hereabove.

The upper run or lap of conveyor belt 58 is supported by the flat horizontal portions 21 of U-shaped channel 20. Attached to bearing lug 22 is a suitably shaped bowling pin receiving pan 60, the front end of which is so located with respect to rotating pin elevator E, that bowling pins elevated thereby are delivered to pan 60 for delivery in turn onto conveyor belt 58.

The rear end of pan 60 is provided with a pair of spaced-upright flanges 62 secured to a pair of spaced upright guide plates 64, each of which is attached to an upright outer wall of U-shaped conveyor channel 20. Guide plates 64 extend only a predetermined distance along conveyor belt 58, and serve as a guide channel for pins carried and advanced thereby as illustrated in FIGURE 1. The upward and outwardly flaring portions 61 of pan 60 are so constructed and operated that as each bowling pin is delivered from wheel E into pan 60, portions 61 so orient the pins, that each pin will be delivered butt end forwardly only onto conveyor belt 58. The construction and operation of pan 60 is similar to that disclosed in Holloway et al. Patent 2,767,983 above referred to.

In order to insure that bowling pins advanced by belt 58 will be delivered into proper storage bins, distributor C is provided with means for effecting the selective delivery of pins therefrom. A preferred means for effecting this selective delivery of pins selected for purposes of illustration takes the form of three swingable gates, 66, 68 and 70, which are operated in accordance with a predetermined program to move into the paths of bowling pins being advanced butt-end forwardly by conveyor belt 58 in order to deflect such pins in proper selected sequence into one of the designated pockets S of pins storage and aligning table T.

Each gate 66, 68 and 70 in the form of the invention illustrated comprises a horizontal rod which is an integral part of a vertical actuating rod 72, 74 and 76, respectively. Each rod 72, 74 and 76 is rotatably supported by a pair of vertically spaced bearing lugs 78, all of which are secured to the outer vertical sides or walls of U-shaped distributor channel 20 (see FIGURES 2, 3, 4 and 5). Referring to FIGURES 1, 2 and 3, it will be seen that rod 76 which forms an integral part of gate 70 is located on one side of distributor C. Rods 72 and 74 which are formed integrally with gates 66 and 68, respectively, are rotatably mounted on the opposite side of distributor C. Thus, distributor C is provided with one gate 70 on one side, and two gates 66 and 68 on the other. While gates 66 and 68, when in closed position, form a continuation of the side guide plate 64, on one side of the conveyor; the gate 72, together with a pair of adjacent inverted U-shaped stationary guide-rods 80 and 82, form a continuation of the side guide plate 64 on the other side of the conveyor. In this manner, when all gates are closed, a pin P carried and advanced butt-end forwardly by conveyor belt 58 will be guided by the pin guide channel thus formed from the pin receiving end to the delivery end and when selected gates are opened at a selected portion of distributor C where pins drop off, and thus are delivered to proper pockets S of table T.

The U-shaped guide rods 80 and 82 are fixedly attached to bearing lugs 78, and other suitable lugs suitably mounted or carried on the outer rear side of channel 20. Secured to the bottom end of each of the actuating rods 72, 74 and 76 of gates 66, 68 and 70, respectively, is a collar 84 to which is anchored one end of a torsion spring 86, which surrounds the lower portion of vertical rods 72, 74 and 76. The other end of each spring 86 is fastened to the respective lower bearing lug 78 supporting each rod. Springs 86 are provided for the purpose of maintaining each gate 66, 68 and 70 normally closed and in engagement with stop lugs 88, 90 and 92, respectively. Stop lug 88 is fastened to the outer side of one of the side guide plates 64; stop lugs 90 and 92 are secured to a post 94, and to channel guide-rod 80, respectively. Post 94 is fixedly supported by one of the lugs 78.

Bowling pins advanced by conveyor belt 58 are delivered in selected sequential succession into the ten pockets S of pin storage table T. In order to drop the pins, or deliver them properly from conveyor belt 58, one by one into each of the ten pockets S, pin distributor C is oscillated or swung across table T by means of a suitable drive mechanism (FIGURE 1). As illustrated herein, this mechanism includes a suitable gear reduction motor 96, having an output shaft 98 to which is secured a crank arm 100. Connected to the free-end of crank arm 100, is a rod 102 which is attached to a stud 104 projecting from and held by a bracket 106, suitably secured to the bottom side of conveyor channel 20 (FIGURE 1). In order to support distributing conveyor C properly, and to insure that it will be maintained at a proper distance above storage table T for delivery of pins into the several pockets thereof, distributor C is provided with a suitably shaped shoe 108 attached to the bottom side of channel 20. Referring to FIGURE 2, it will be seen that shoe 108 is mounted to slide over a shelf 110 on table T as distributor conveyor C oscillates back and forth above table T. Shelf 110, may be an integral part of table T and extends from the rear thereof, as indicated in FIGURES 1 and 10. Table T is provided with ten, triangularly arranged openings or pockets S, conforming generally to the customary spotting arrangements of bowling pins on the playing deck of a bowling alley. Obviously if desired, another arrangement could be made so far as the number and pattern of bowling pins are concerned. In the embodiment of the invention illustrated herein, the walls of each pocket S are inclined, as shown especially in FIGURES 7 and 8. The shape of the openings or pockets S is oblong and large enough to accommodate a bowling pin in horizontal position. The openings of the pockets due to the slanting of the walls, are larger at the top than at the bottom, thereby facilitating the deposit of pins into pocket S.

In the form illustrated, the bottom of each pocket S is formed by a pair of spaced rods 112 extending in the general direction of the longitudinal axis of a pocket and shaped in such a manner as to insure that any pin resting thereon will be supported in a substantially horizontal position, as illustrated in FIGURES 7, 8, and 11.

The ends of each pin supporting rod 112 are bent so that they extend at each end at right-angles and transversely to the longitudinal axis of each pocket, thereby forming two parallel arms of supporting rod portions 114 and 116, as illustrated in FIGURE 10. The ends of each of the pin supporting rods arms 114 and 116 are secured to hubs 118 and 120, respectively. Referring to FIGURE 10, it will be seen that hub 118 of each pair of pin supporting rods 112 for the pockets #1, #2, #3, #4, #6, #7 and #10 are pivotally supported by means of stud shafts 122, all of which are held by individual bearing brackets 124 secured to the bottom side of table T. The hubs 120 of each pair of pin supporting rods 112 for the pockets #5, #8 and #9, however, are mounted on shafts 126 rotatably supported in bearing brackets 128 attached to the bottom side of table T. The hubs of each pair of arms 116 of each pair of pin supporting rods 112, for pockets #7, #8, #9 and #10 are secured to shafts 130, rotatably supported in suitable bearing brackets 132, secured to the bottom side of table T. Hubs 120 of each pair of arms 116 of each pair of pin supporting rods 112 for the pockets #4, #5 and #6 are mounted on shafts 134, rotatably supported in bearing brackets 136, and bearing brackets 132, all attached to the bottom side of table T. The hubs 118 of the pair of arms 114 of pin supporting rods 112 of pocket #5 are attached to the pair of shafts 126 to which hubs 120 of arms 116 of the pin supporting rods 112 of pocket #1 are secured. Hubs 118 of the pair of arms 114 of the pin supporting rods 112 of pocket #8 are mounted on the pair of shafts 26 to which hubs 120 of arms 116 of pin supporting rods 112 of pocket #2 are mounted. Also, hubs 118 of the pair of arms 114 of pin supporting rods 112 for pocket #9 are attached to the same pair of shafts 126 as hubs 120 of arms 116 of the pin supporting rods 112 for pocket #3 are mounted. From the above, it will follow that pin supporting rods 112 for pockets #8 and #2 are connected to each other, and in the same manner the pin supporting rods for pockets #1 and #5. The same applies also to pin supporting rods for pockets #9 and #3. It may also be noted that the fulcrum points of each pin supporting rod 112, as well as each row of the pin supporting rods are in lines parallel to each other, and that each of the fulcrum points is representative by means of shaft 130, and each shaft 134.

Shafts 130 and 134 extend outwardly beyond their bearing brackets 132, as shown in FIGURE 10. Attached to the free end of each shaft 130 and 134 is a suitably shaped latch lever 138, which at its free end loosely engages with the hook shaped end 140 of a bell-crank shaped lock lever 142. These levers are loosely mounted on stud shafts 144 held by and projecting from the rear end of table T, (FIGS. 8 and 9). The upper free end of each lock lever 142 carries a pivotally mounted cam follower 146, which engages with the lower edge of a horizontal cam bar 148 slidably supported by spaced brackets 150, secured to the rear end of table T, as shown in FIGURES 7, 8 and 9. Each stud shaft 144 is surrounded by a suitable spring 152 (FIG. 9), which has one end anchored to a pin 154, projecting from the rear end of table T. Its other end presses against the upper arm of its associated lock lever 142, thus keeping cam follower 146 in constant engagement with the lower edge of cam bar 148.

The lower edge of cam bar 148 is provided with a plurality of sets of spaced inclined high cam faces 156. One end of bar 148 is pivotally connected to the free end 158 of armature or plunger 159 projecting from solenoid 160 suitably secured to the rear wall of table T. The construction of the mechanism just described is such that when solenoid 160 is energized, armature will move to the right, as viewed in FIGURE 7, thereby causing cam bar 148 to move to the right and thus move cam faces 156 over cam followers 146. This action causes all of the lock levers 142 to be rocked in such manner that the hook shaped ends 140 thereof move upwardly out of engagement with the free ends of latch levers 138, thereby unlocking support rods 112 for discharge of pins from pockets 5.

When there are pins in pockets S of table T resting on the pin supporting rods 112, which form the bottom of each pocket, the weight of the pins upon the now unlocked pin supporting rods causes them to swing downwardly whereupon the pins drop out of said pockets into a suitable spotting mechanism (not shown). As soon as pins have been delivered to the spotting mechanism, the several latch levers 138 swing upwardly under the action of springs 162. Each spring 162 is so designed as to yield under the weight of a pin P resting on supporting rods 112 when the latter are not locked in "up" position by means of latch levers 138. However, each torsion spring is strong enough to return each supporting rod 112 of each row of supporting rods to its "up" position after the pins have dropped out of the pockets. Then each latch lever 138 is again engaged by the hook-shaped end 140 of its respective lock lever 142 and rods 112 are held in locked pin supporting positions. Since the energization of the solenoid 160 need only be of short duration to permit unlocking of the latch levers 138, the latter, due to the action of springs 162 because of their cam faces 139 can readily snap into engagement with their respective lock levers 142 although the lock hooks 140 may be in the path of the upwardly swinging latch levers 138. To keep all pin supporting rods 112 in the same plane when in "up" position and to prevent over travel of all latch levers 138 when in or upon reaching their "up" position, each latch lever 138 is arrested by means of a stop pin 164 when rods 112 reach their upmost position as shown in FIGURES 8 and 9.

In order to effect a proper programmed delivery of pins from conveyor C into pockets S of storage table T, each collar 84 on the lower end of each of the actuating rods 72, 74 and 76 of gates 66, 68 and 70, respectively, carries a flexible stop arm, such as an upright leaf spring 166 which is secured to and extends horizontally from each of the collars 84, as illustrated in FIGS. 2, 3, 4 and 5. A short distance above each leaf spring carrying collar 84 on each of the vertical actuating rods 72, 74 and 76 of gates 66, 68 and 70 respectively, is mounted another collar 168, 170 and 172 respectively. Each of the collars 168, 170 and 172 are provided with a projecting lug 174, 176 and 178 respectively. When each gate 66, 68 and 70 is in its normal closed position, each lug 174, 176 and 178 is in contact with the switch operating button of switches 180, 182 and 184, respectively, for the purpose of keeping these switches closed when said gates are closed. Switches 180, 182 and 184 are suitably secured to the inner walls of the U-shaped conveyor channel 20.

Beneath each gate 66, 68 and 70 adjacent the outer edges of the upper run or lap of conveyor belt 58, and substantially co-planar with portion 21 of channel 20 are movably mounted suitably shaped elongated trip bars 186, 188, 190 (FIGS. 2, 3, 4, and 5). Each trip bar is slightly shorter than the length of its respective gate, and its ends slidably engage with a pair of spaced vertical studs 192 fixedly secured in suitable lugs 194 (FIGS. 2 and 5), which are secured to the inner up-right walls of U-shaped conveyor channel 20.

Surrounding each stud 192 and confined between the top side of each lug 194 and the bottom side of each trip bar is a compression spring 196 (FIG. 5). One pair of springs yieldingly supports each trip bar 186, 188 and 190. Beneath the trip bars 186, 188 and 190 and intermediate their ends are mounted normally open switches 198, 200 and 202, respectively, all of which are suitably held by and secured to the inner wall of the conveyor channel 20.

A transversely extending plate 204 attached to flanges 203 of channel 20 carries a downwardly projecting vertical stud shaft 206 (FIGS. 1, 2, 5 and 6) which pivotally supports a hub 208 provided with a horizontally extending lug 210, which normally is in contact with the operating button of a sequence control switch 212. Switch 212 is supported by bracket 214 fastened to and suspended from plate 204. Extending from hub 208, but spaced 180 deg. apart from lug 210 is a flexible member, such as leaf spring 216, the function of which will be explained hereinafter. Surrounding the upper portion of vertical stud 206 is a spring 218, having one end anchored to plate 204 and its other end hooked to lug 210 on hub 208 to keep lug 210 in contact with the operating button of switch 212. Excess pressure by lug 210 on the button of switch 212 is avoided by the use of a vertical stop pin 220 which extends downwardly from plate 204 into position to be engaged by lug 210 and limit its movement towards switch 212 (FIGS. 2 and 6).

The front end of distributor C is provided with a trip mechanism which comprises a pair of spaced arms 224 pivotally mounted on shaft 54 (FIGURES 1, 2, 3 and 4). Extending between arms 224, and secured thereto, is a bridge or trip plate 222. One arm 224, as shown in FIGURES 2, 3 and 4 carries a rearwardly projecting extension 226. A pair of opposed balance springs 228 (FIGURE 4), each having one end attached to the top and bottom of extension 226 serve to yieldingly balance trip plate 222 and maintain it in proper operating position relative to the delivery end of conveyor belt 58 of distributor C. The other ends of springs 228 are suitably secured to the housing of control switch 230, and a bracket 229 mounted on channel 20. Normally open sequence control switch 230 (FIGS. 3 and 4) secured to the inner wall of distributor conveyor channel 20 above extension 226.

As mentioned hereinabove, distributor boom C is traveled as shown by arrows H and K back and forth above table T to effect the delivery of bowling pins into the ten pockets S. In order to provide for the proper delivery of pins into the several pockets, as shown in FIGURE 1, there is mounted adjacent one side edge of each pocket S of table T, with the exception of pocket number 1 of table T, a vertical stop or indexing pin 232. An indexing pin 234 is also provided for pocket number 1. This pin, however, is located in the central rear portion of table T, as illustrated in FIGURE 1. All indexing pins 232 and 234 project upwardly above the top face of table T so that each pin projects into the path of one of the leaf springs 166 carried by the vertical actuating rods of gates 66, 68 and 70.

As mentioned hereinabove, pin distributor C is designed to forward bowling pins P, delivered thereto from elevator E, and deposit one pin at a time in accordance with a predetermined sequence of operations in each pocket S of the pin storage and aligning in table T as it is moved across the top of the table.

In order to deposit a pin in each pocket of the table, pin distributor C stops adjacent each pocket while the proper selected gate 66, 68 or 70 is moved across the pin conveyor belt 58 into the path of travel of pins being advanced thereby so that each pin is directed by the gate from the continuously moving conveyor belt 58 and rolls generally horizontally into a particular selected pocket. The stopping of distributor C and the swinging of the gates is accomplished in the following manner:

While several patterned sequences for the delivery of pins from distributor C could be used, the following is one which has been found to give good results. As shown in FIGURE 1, when the distributor C moves from its starting position F in the direction of arrow K to deliver the first pin in #7 pocket of table T, leaf spring 166 carried by vertical actuating rod 72 of gate 66 engages with indexing pin 232 adjacent #7. This causes rod 72 to rotate and effect a horizontal swing of gate 66 diagonally across conveyor belt 58 until gate 66 is arrested by stop pin 236 (FIGURE 2) which projects downwardly from channel guide rod 80.

The rotation of actuating rod 72 of gate 66 also causes lug 174 which is carried by collar 168 secured to rod 72 to move out of contact with sequence control switch 180 (FIGS. 3 and 4) and thus open the switch and break the circuit through motor 96, which arrests the horizontal movement of distributor C relative to table T. When the bowling pin P forwarded by the conveyor belt 58 contacts gate 66 it is directed thereby into pocket #7 as illustrated in FIG. 1. As pin P drops over the edge of distributor C into pocket #7, the weight thereof causes spring mounted trip bar 186 to be depressed to such an extent that normally open switch 198 is closed long enough to operate distributor motor 96, which moves distributor C away from pocket #7. As the distributor moves away from pocket #7, spring leaf 166 on vertical rod 72 of gate 66 simply snaps around the indexing pin 232 of pocket #7 after which, due to the action of spring 86 on rod 72, gate 66 will return to its dwell or inoperative position (see FIG. 3) and lug 174 on rod 72 will again depress the contact button of switch 198 causing a closing of the circuit through the power line to distributor motor 96 which keeps the distributor moving until the spring leaf 166 on the vertical actuating rod 72 of gate 66 next engages index pin 232 adjacent pocket #8 where the process of delivering a pin is repeated in the same manner as described for the #7 pocket. After a pin is dropped into pocket #8, and in response to the actuation of motor 96, as described above, distributor C resumes its horizontal motion across the table T until the leaf spring 166 carried by collar 84 on vertical actuating rod 74 of gate 68 contacts the indexing pin 232 of pocket #2 causing a clockwise rotation of vertical rod 74 of gate 67, (as viewed in FIGURE 1) which swings gate 68 diagonally across conveyor belt 58, until it contacts vertical rod 68 and its movement is arrested. The clockwise rotation of vertical rod 74 of gate 68 results in the disengagement of lug 176 from the contact button of switch 182 which causes switch 182 to open and break the circuit through motor 96 which stops the movement of distributor C. When the pin forwarded by conveyor belt 58 engages with the now open gate 68 (shown partially in dotted lines in FIG. 3) it is cammed off conveyor 58 and directed into pocket #2. The weight of the pin when moving over the edge of the distributor and into pocket #2 depresses trip bar 188 causing switch 200 to close. This reestablishes the circuit through motor 96 and thus effects the resumption of horizontal movement of the distributor C until the leaf spring 166 on vertical rod 74 has cleared the index pin 232 of pocket #2 and the spring 86 on rod 74 has effected the closing of gate 68 as well as the closing of switch 182 by lug 176 mounted on rod 74. Distributor C resumes its movement across table T in the same direction until the leaf spring 166 carried by vertical rod 74 of gate 68 contacts the index pin 232 of pocket #3 and again effects the opening of gate 68 and the arrest of the distributor in the same manner as described directly above. A pin is delivered into pocket #3 and the distributor C resumes its motion across the table in the same manner as described heretofore until leaf spring 166 carried by vertical rod 72 of gate 66 contacts the indexing pin 232 of pocket #9 and causes the opening of gate 66 and the arrest of the movement of the distributor C. After a pin is delivered from conveyor belt 58 and deposited in pocket #9, distributor C again resumes its movement across table in the same manner as previously described until again arrested by means of the contact of the indexing pin 232 of pocket #10 with leaf spring 166 carried by vertical rod 72 of gate 66 which is again moved diagonally across the conveyor belt 58 to cam the forwarded pin into said pocket #10. After a pin is deposited into pocket #10, the distributor again resumes its horizontal movement in the manner described in the same direction away from this pocket but only for a short distance until the distributor actuating crank arm 100 has completed one-half of its horizontal rotation or 180° movement from its starting position.

Since it is highly desirable to resume the motion of the arrested distributor away from a pocket to which a pin was delivered and not over it, after the distributor actuating crank arm 100 passes the 180° rotation point distributor C is caused to move in opposite direction back over the table again as indicated by the dotted arrow H shown in FIG. 1. This backward movement of distributor C across the table T continues until leaf spring 166 on collar 84 carried by the vertical actuating rod 76 of gate 70 contacts the indexing pin 232 of pocket #6, whereupon vertical rod 76 rotates in a counter-clock-wise direction as viewed in FIGURE 1 causing gate 70 to swing diagonally across conveyor belt 58 and, at the same time, effect the disengagement of lug 178 carried by rod 76 from the contact button of the switch 184 and thus open the latter. The opening of switch 184 interrupts the power supply to distributor C. The bowling pin being forwarded by conveyor belt 58 is directed by the now open gate 70 into pocket #6 of table T. As this bowling pin drops from distributor C into #6 pocket, the weight of the pin depresses the spring mounted trip bar 190, which, in turn engages with the contact button of switch 202 causing the latter to close long enough to start motor 96 whereupon distributor C resumes its horizontal clockwise movement, as viewed in FIGURE 1. This movement results in the spring leaf 166 carried by vertical rod 76 snapping around the indexing pin 232 of pocket #6, which effects a closing of switch 184 mentioned heretofore. Distributor C continues its clock-wise horizontal motion above table T until leaf spring 216 carried by lug 208 pivotally mounted on vertical stud 206 engages with indexing pin 234. Indexing pin 234 is also designed and provided for the purpose of bringing the forward end of the distributor in line with longitudinal axis or center line of the #1 pocket. As leaf spring 216, carried by hub 208, engages indexing pin 234, hub 208 is rotated in a counter-clock-wise direction causing lug 210 on hub 208 to move out of engagement with the contact button of the switch 212 thereby opening this switch and interrupting the power supply to distributor activating motor 96 and stopping the movement of distributor C. All gates 66, 68 and 70 being in closed position and held closed by means of their associated springs 86, the bowling pin now forwarded by conveyor belt 58 is guided straight to the forward end of distributor C and deposited butt-end first into #1 pocket of table T. As this bowling pin drops from the end of distributor C into the #1 pocket, it passes over pivotally mounted spring balanced trip plate 222 causing it to be pressed downward such that its extension 226 effects the closing of normally open switch 230 to provide starting power to distributor actuating motor 96 until the spring leaf 216 has snapped around the indexing pin 234 and torsion spring 218 acting on hub 208 has returned lug 210 into engagement with the contact button of switch 212 thereby closing it. It may be pointed out at this time that there will be no effect on the switch 212 when the spring leaf 216 on hub 208 contacts indexing pin 234 during the forward or counter clockwise swing of distributor C in the direction of arrow K (FIG. 1). The leaf spring 216 simply snaps around the indexing pin 234 and stop pin 220 projecting from the bottom side of distributor C prevents any movement to rotation of hub 208 so that lug 210 remains in engagement with the contact button of switch 212 and also prevents any damage thereto.

Distributor C, after the disengagement of leaf spring 216 from indexing pin 234, mentioned above, continues its horizontal clockwise swing until leaf spring 166 carried by vertical rod 76 of gate 70 engages with the indexing pin 232 of pocket #5 which effects the arrest of distributor C and the swing of gate 70 across the conveyor belt 58 in the same manner as described heretofore. After the trip bar 190 adjacent gate 70 is actuated by the pin being deposited into #5 pocket, distributor C continues its horizontal clockwise movement until leaf spring 166 on vertical rod 76 of gate 70 engages with indexing pin 232 of pocket #4 which again causes the gate 70 to swing across the conveyor belt 58 and, at the same time, effect the arrest of distributor C in the manner described hereinabove. After a bowling pin forwarded by the conveyor belt 58 is cammed therefrom by gate 70 deposited in the #4 pocket and the pin during this action has actuated or depressed trip bar 190, distributor C resumes its horizontal clockwise motion in the direction of arrow F until a stud 240 projecting horizontally from one of the distributor channel guide plates 64 engages with the contact button of stop switch 242 which opens it. This causes disruption of power to the distributor actuating motor 96 and consequently arrests the further movement of distributor C after the latter has traveled or rotated horizontally 180° in clockwise direction as indicated by arrow H, as shown in FIGURE 1.

In the schematic circuit diagram shown in FIGURE 12, stop switch 242 is provided with a pair of normally closed contacts 243 and a pair of normally open contacts 244. When distributor C occupies the position shown in dotted lines in FIGURE 1, contacts 243 are open and contacts 244 are closed, and an indicator lump 246 is lighted thus giving a visual indication that distributor C has completed its cycle and that the ten pockets of the table T contain a complete set of bowling pins. The attendant or bowler may then press a pin release button 248 employed to energize solenoid 160 to effect the release of the locking mechanism for the pin supporting rods 112 which form the bottom of the pockets S in table T, and the pins when released from pockets S may be delivered into suitable spotting cups of an automatic bowling pin setting device, such for example as shown in Patent 2,781,195.

In order to refill the now empty pockets with a new set of pins the attendant or bowler may push a normally open start button 250 (FIG. 12), which shunts the now open contacts 243 of stop switch 242 and thus provides power to start distributor actuating motor 96 for a new cycle. As soon as distributor C starts to move in its horizontal anti-clockwise direction or that indicated by arrow K in FIGURE 1, stud 240 on distributor C moves out of engagement with stop switch 242 thereby closing contacts 243, and extinguishing light 246 due to the opening of contacts 244. Distributor C then moves through its normal cycle as described above.

As mentioned earlier and shown in FIG. 12, the motor 44, employed to drive the conveyor belt 58 of the distributor, is driven continuously. However, a switch 252 (FIG. 12) provided in the power line may be opened if the arrest of this motor is desired.

What is claimed is:

1. A bowling pin handling apparatus for use with a bowling pin spotting machine comprising an elongated fixed-length pin distributing conveyor, a pin receiving and storing table, means mounting said table beneath said conveyor, a plurality of pin receiving and storing pockets arranged in generally triangular formation in said table, means pivotally mounting one end of said conveyor whereby the other end thereof can swing in a substantially horizontal plane above said pockets, means for moving said conveyor across said table for delivery of pins into said pockets and discharge means coacting with said conveyor to effect the delivery of pins laterally from at least one side of the conveyor and longitudinally from the other end thereof into said pockets.

2. The apparatus defined in claim 1 wherein said pin conveyor includes endless travelling belt pin conveying means.

3. An article handling and conveying apparatus comprising an elongated fixed-length conveyor having a receiving end and a discharge end and a plurality of discharge stations located between said ends, means for delivering articles to said receiving end of said conveyor, means movably supporting said receiving end of said conveyor adjacent said delivering means, a device for receiving and storing articles discharged from said conveyor, means for moving said conveyor on said movable support means to discharge articles in succession from said conveyor, and mechanism for selectively effecting the delivery of articles from said discharge end and from selected discharge stations into said receiving and storing device.

4. The invention defined in claim 3 wherein said conveyor moving means is operative to move said conveyor intermittently, and wherein said receiving and storage device is provided with a plurality of pockets arranged in a predetermined array, and said mechanism comprises pin diverting means carried by said conveyor, and means for selectively actuating said pin diverting means for effecting the discharge of said articles laterally and longitudinally from said conveyor into selected pockets.

5. The invention defined in claim 4, including means mounting said storage device in a substantially horizontal position beneath said conveyor, and said discharge end of said conveyor extends outwardly from its mounting means above said device.

6. The invention defined in claim 3 wherein said storage device comprises a substantially horizontal table having a plurality of side by side and longitudinally disposed receiving and storing pockets, and wherein said mechanism includes means for discharging at least one article from said discharge end of said conveyor and a plurality of articles one by one from said stations between the receiving and discharge ends of said conveyor laterally from said conveyor into said selected pockets.

7. The invention defined in claim 3 wherein said mechanism includes gates carried by said conveyor, means mounting said gates to move into the path of movement of selected articles moving along said conveyor, whereby said articles are discharged from the sides of said conveyor into said selected pockets, and means for incapacitating the movement of said conveyor when an article is to be discharged therefrom.

8. The invention defined in claim 1 including means for continuing the movement of said conveyor across said table until all of said pockets contain a bowling pin, and means for effecting the simultaneous discharge of all of said pins from all of said pockets.

9. A bowling pin handling and distributing apparatus comprising an elongated fixed-length boom, endless movable belt pin conveying means carried by said boom, means for driving said belt means, a pin elevator for delivering pins in succession to said belt conveying means, a pin receiving and storage table, a support adjacent said elevator mounting one end of said boom for swinging movement back and forth in a substantial horizontal path of travel above said table, a plurality of pin holding pockets in said table, a plurality of discharge stations on said boom for delivering pins laterally and longitudinally therefrom, means for intermittently moving said boom across said table, and means operative in response to each predetermined extent of intermittent travel of said boom to effect the delivery of a pin from a selected station into a selected pocket in said table.

10. The invention defined in claim 9 wherein said discharge stations comprise a terminal discharge station at the free end of said boom, and a plurality of stations located intermediate said support and said free end of said boom, and a movable diverter located at each of said intermediate discharge stations.

11. The invention defined in claim 10 including a shoe carried by the free end of said boom, means mounting said shoe to depend downwardly therefrom, and a support plate carried by said table on which said shoe slides during the movement of said boom back and forth across said table.

12. An article handling apparatus comprising an elongated fixed-length conveyor including endless belt conveying means, a support mounting one end of said conveyor for swinging movement of the free end thereof in a substantially horizontal plane, a receiving and storing table positioned beneath said conveyor and spaced from the path of travel of said conveyor thereover, a plurality of triangularly arranged pockets carried by said table, means for operating said belt means to convey articles along said conveyor for discharge generally horizontally therefrom into said pockets, means for moving said conveyor to locate it in positions for delivery of articles into said pockets, discharge means coacting with said conveyor to effect the delivery of articles from at least one side of the conveyor and longitudinally from the other end thereof, and means for incapacitating the movement of said conveyor when all of said pockets have been filled.

13. The invention defined in claim 12, including means for effecting the substantially simultaneous discharge of all of said articles from said pockets.

14. A bowling pin handling apparatus for use with a bowling pin spotting machine comprising an elongated fixed length pin distributing conveyor, a pin receiving and storing table, means mounting said table beneath said conveyor, a plurality of horizontal pin receiving and storing pockets arranged in generally triangular formation in said table, means pivotally mounting one end of said conveyor whereby the other free end thereof can swing in a substantially horizontal plane above said pockets, means for moving said conveyor across said table to deliver bowling pins into said pockets, said distributor conveyor comprising a plurality of pin diverting members, and means operative in response to the movement of said distributor conveyor by said moving means for effecting a selective controlled delivery of pins by said members longitudinally and laterally from said distributor conveyor into said pockets.

15. Article handling apparatus comprising in combination a substantially horizontal structure adapted to receive a plurality of articles and means for distributing a plurality of articles in succession to said receiving structure, said distributing means comprising: a conveyor, means supporting said conveyor for horizontal movement above said receiving structure, means for supplying articles to a receiving end of said conveyor, means driving said conveyor in a direction to convey articles over said article receiving structure, a plurality of elements on said conveyor operably mounted individually for movement selectively into the path of article delivery, thereby to effect movement of articles off the sides of the conveyor, means operable to effect said movement of the conveyor across said receiving structure to successive positions, and means for operating said elements in a predetermined sequence and in timed relation to the arrival of the conveyor at successive article distribution positions relative to said article receiving structure.

16. Apparatus according to claim 15, wherein said elements are arranged at both sides of said conveyor and at spaced locations along the length thereof.

17. Apparatus according to claim 15, wherein said elements are located at spaced locations along the length of said conveyor.

18. Article handling apparatus comprising in combination a substantially horizontal structure adapted to receive a plurality of articles and means for distributing a plurality of articles in succession to said receiving structure, said distributing means comprising: a conveyor, means supporting said conveyor for horizontal movement above said receiving structure, means supplying articles to said conveyor, means driving said conveyor in a direction to convey articles toward and over said articles receiving structure, means for effecting said horizontal movement of the conveyor above said receiving structure, first means associated with said conveyor at a point along the length thereof for effecting the movement of articles off at least one side of the conveyor and their delivery to said article receiving structure, second means associated with said conveyor at a point spaced from said first means along its length for effecting similarly the movement of articles off at least one side of the conveyor, and means for selectively operating said first and second means in sequence in timed relation to the operation of said conveyor moving means to provide article distribution to different areas of said article receiving structure in accordance with a predetermined sequence of article distribution.

19. Apparatus according to claim 18, wherein said conveyor has an outer delivery end portion positioned above said article receiving structure and wherein said means for operating said first and second means includes means for rendering both said means inoperative to permit movement of articles off said end portion.

20. Apparatus according to claim 18, wherein said conveyor is mounted for swinging movement back and forth across said article receiving structure.

21. A bowling pin handling apparatus for use with a bowling pin spotting machine comprising an elongated fixed length pin distributing conveyor, a pin receiving and storing table, means mounting said table beneath said conveyor, a plurality of pin receiving and storing pockets arranged in generally triangular formation in said table, means pivotally mounting one end of said conveyor whereby the other end thereof can swing in a substantially horizontal plane above said pockets, means for moving said conveyor across said table to deliver bowling pins into said pockets, said distributing conveyor comprising a plurality of pin diverting members, means operative in response to said pin distributing conveyor by said moving means for effecting a selective controlled delivery of pins laterally from said distributing conveyor into said pockets, said last named means comprising trip means on said table adjacent said pockets, and actuating means operatively associated with said diverting members for actuating a selected member to divert a pin from said distributor conveyor into a selected pocket in response to the positioning of said distributor conveyor at a point representing the delivery station for said pin to said selected pocket.

22. The apparatus defined in claim 21 wherein said means for moving said distributing conveyor includes an operating circuit, a motor in said circuit, means operatively connecting said motor to said distributing conveyor to effect the movement of said distributing conveyor back and forth above said table, means for incapacitating said motor when said distributing conveyor reaches each selected point of discharge of a pin into a selected pocket and other means operative in response to the delivery of each pin from said distributing conveyor into its respective selected pocket for reinstating the operation of said motor whereby to effect the movement of said distributing conveyor to a point of discharge of the next pin in a succession of pins to the next selected pocket.

23. An article handling apparatus comprising an elongated fixed length conveyor including endless belt conveying means, a support mounting one end of said conveyor for swinging movement of the free end thereof in a substantially horizontal plane, a receiving and storing table positioned beneath and spaced from the path of travel of said boom thereover, a plurality of triangularly arranged pockets carried by said table, means for operating said belt means to convey articles along said boom for discharge generally horizontally therefrom into said pockets, means for incapacitating the movement of said conveyor when all of said pockets have been filled, pin diverting elements carried by said conveyor intermediate said support and said free end thereof, a terminal discharge station at the free end of said conveyor, and means on said table operative to effect the movement of selected diverting elements relative to said conveyor to divert articles into selected pockets of said table.

References Cited by the Examiner

UNITED STATES PATENTS

| | | | |
|---|---|---|---|
| 1,667,714 | 5/1928 | Bacheller | 198—31.3 |
| 2,767,984 | 10/1956 | Zuercher | 273—43 |
| 2,911,218 | 11/1959 | Scherzinger | 273—43 |
| 3,041,072 | 6/1962 | Dowd et al. | 273—43 X |

RICHARD C. PINKHAM, *Primary Examiner.*

DALBERT B. LOWE, ANTON O. OECHSLE,
*Examiners.*